US011131462B2

(12) United States Patent
Toyama (10) Patent No.: US 11,131,462 B2
(45) Date of Patent: Sep. 28, 2021

(54) HANDHELD CERAMIC INFRARED BURNER

(71) Applicant: Prime Sear, LLC, Middleton, WI (US)

(72) Inventor: Hirohide Toyama, Middleton, WI (US)

(73) Assignee: Prime Sear, LLC, Middleton, WI (US)

( * ) Notice: Subject to any disclaimer, the term of this patent is extended or adjusted under 35 U.S.C. 154(b) by 224 days.

(21) Appl. No.: 16/408,666

(22) Filed: May 10, 2019

(65) Prior Publication Data

US 2020/0063970 A1    Feb. 27, 2020

Related U.S. Application Data

(60) Provisional application No. 62/720,613, filed on Aug. 21, 2018.

(51) Int. Cl.
  *F24C 3/14*     (2006.01)
  *A47J 37/07*    (2006.01)
(52) U.S. Cl.
  CPC ............. *F24C 3/14* (2013.01); *A47J 37/0786* (2013.01); *A47J 37/0713* (2013.01)
(58) Field of Classification Search
  CPC ..... A47J 37/0786; A47J 37/0713; F24C 3/14; F24C 3/04
  See application file for complete search history.

(56) References Cited

U.S. PATENT DOCUMENTS 2,775,294 A   12/1956 Schwank
3,139,879 A    7/1964 Bauer et al.
(Continued)

FOREIGN PATENT DOCUMENTS

WO       2017112936       6/2017

OTHER PUBLICATIONS

Owner's Manual: Infrared Broilers, Southbend, 2014, Manual 1199790 Rev 0 (Jun. 2014), US.
(Continued)

*Primary Examiner* — Alfred Basichas
(74) *Attorney, Agent, or Firm* — Lee Sheikh Megley & Haan LLC (57) ABSTRACT

Portable handheld ceramic tile infrared burners and methods for using the same are disclosed for use to heat objects including to broil steak and other foods. In particular, a portable handheld ceramic tile infrared burner comprising a ceramic tile infrared burner assembly, a handle for maneuvering the ceramic tile infrared burner assembly during use, and a gas supply line for connecting to a gas source is disclosed. In some embodiments, the handle and gas supply line are integrated such that the gas supply line serves as the handle for maneuvering the ceramic tile infrared burner assembly during use. In some embodiments, the ceramic tile infrared burner assembly is at least partially enclosed in a housing. The handle may be connected to the housing or to the ceramic tile infrared burner assembly. The portable handheld ceramic tile infrared burner may further comprise one or more heat shields. The portable handheld ceramic tile infrared burner may be configured to connect to disposable or refillable gas cylinders or to a natural gas line. In some embodiments, the portable handheld ceramic tile infrared burner comprises a valve. In further embodiments, the portable handheld ceramic tile infrared burner comprises a gas adjustable regulator or a gas nonadjustable regulator. The portable handheld ceramic tile infrared burner may be used alone or as an auxiliary or additional heat source either simultaneously with or in series to other cooking processes, such as grilling, oven cooking or sous vide method, to achieve desired temperatures.

13 Claims, 3 Drawing Sheets

(56) References Cited

U.S. PATENT DOCUMENTS

| | | | | |
|---|---|---|---|---|
| 3,814,573 | A | * | 6/1974 | Karlovetz ............. F23D 14/145 431/329 |
| 3,857,670 | A | * | 12/1974 | Karlovetz ............... D06F 67/02 431/329 |
| 3,941,116 | A | * | 3/1976 | Placek ...................... F24C 3/14 126/92 B |
| 3,943,910 | A | | 3/1976 | White |
| 3,975,140 | A | * | 8/1976 | Placek ................. B60H 1/0025 431/329 |
| 4,201,796 | A | | 5/1980 | Harkins |
| 4,364,372 | A | | 12/1982 | Johnson |
| 4,545,759 | A | * | 10/1985 | Giles ...................... F17C 13/04 126/40 |
| 4,569,328 | A | | 2/1986 | Shukla et al. |
| 4,726,767 | A | * | 2/1988 | Nakajima ................ F23D 14/28 432/222 |
| 5,178,535 | A | * | 1/1993 | Delalle ................... B29C 35/04 431/350 |
| 5,327,879 | A | | 7/1994 | Ferraro |
| 5,606,905 | A | | 3/1997 | Boehm et al. |
| 6,302,096 | B1 | * | 10/2001 | Duncan ................... F21S 13/12 126/38 |
| 6,340,298 | B1 | | 1/2002 | Vandrak et al. |
| 6,575,736 | B1 | * | 6/2003 | Aust ....................... F23D 14/14 431/328 |
| 6,648,635 | B2 | | 11/2003 | Vandrak et al. |
| 6,884,065 | B2 | | 4/2005 | Vandrak et al. |
| 8,993,026 | B2 | | 3/2015 | Molnar et al. |
| 9,091,435 | B2 | * | 7/2015 | Jin .......................... F23D 14/08 |
| 9,314,134 | B2 | | 4/2016 | Molnar |
| 9,453,642 | B2 | | 9/2016 | Arnold, III |
| 9,752,775 | B2 | * | 9/2017 | Embury ................ F23D 14/465 |
| 9,957,680 | B1 | * | 5/2018 | Bargoot ..................... E01H 5/10 |
| 2014/0272058 | A1 | | 9/2014 | Dickhans et al. |
| 2015/0245741 | A1 | | 9/2015 | Fechter |
| 2017/0055773 | A1 | | 3/2017 | Maslana et al. |
| 2017/0215642 | A1 | | 8/2017 | Jenkins |

OTHER PUBLICATIONS

Operating Instructions and Owner's Manual: Mr. Heater Portable Radiant Buddy Heater Model # MH4B, Enerco Group, Inc., 2017, 2017-15125-CB.

Operating Instructions and Owner's Manual: Mr. Heater Portable Radiant Buddy Heater Model # MH9BX, Enerco Group, Inc., 2017, 2017-32045-CB.

Instruction Manual: Gas Fired Salamander Models SB36 & SB3618, The Montague Company, 2011, P/N 9326-2 Rev.—A 6/11.

Inferno, NorthFire Ltd. (https://www.northfire.com), retrieved Jun. 6, 2018.

"REVO Handheld Infrared Accelerated Curing System." Chassis Liner Supply (www.chassislinersupply.com/product/revo-handheld-infrared-accelerated-curing-system/), retrieved Jun. 6, 2018.

"1650® Steak Grill with 1700° F." Argo Industries Inc. (https://1650grill.com/us), retrieved May 9, 2019.

"The Otto Grill." Otto Wilde Grillers Inc. (https://www.ottogrills.com/product/otto-grill/), retrieved May 9, 2019.

* cited by examiner

HANDHELD CERAMIC INFRARED BURNER

RELATED APPLICATION

This application claims priority under 35 U.S.C. § 119 to U.S. Provisional Application No. 62/720,613, entitled "Handheld Ceramic Infrared Burner," by the same inventor, filed Aug. 21, 2018, the contents of which are herein incorporated by reference in their entirety.

FIELD

The inventions described and claimed herein relate generally to a gas-fired heating apparatus and methods for use and, more particularly, to portable handheld ceramic tile infrared burners and methods for using the same to heat objects including, for example, to broil steak and other foods, as well as to cure paint or seals.

BACKGROUND OF THE INVENTION

People have long sought to replicate the flavor and cooking quality achieved by their favorite steakhouse. A fundamental problem with this endeavor is that many high-end steakhouses use commercial grade infrared broilers or salamanders, such as those manufactured by Southbend or Montague. Through use of infrared ceramic tile burners, this equipment can rapidly reach cooking temperatures at or exceeding 1600 degrees Fahrenheit (approximately 871 degrees Celsius). This enables steakhouses to achieve the requisite sear, also known as char, browning or "Maillard effect," to produce desirable flavors. Acquiring such commercial equipment for home use is neither practical nor economically feasible for most consumers due to their large size and high cost.

Heretofore, a number of devices have been developed to attempt to satisfy the consumer desire for restaurant-quality cooking of steak and other food at home. For example, U.S. Pat. No. 8,993,026 B2 to Molnar et al. for an "Infrared Portable Broiler," issued Mar. 31, 2015, purports to disclose an infrared-style broiler sized to be portable, safe, and occupy minimal space. The Molnar patented broiler, ostensibly marketed as the Namath Rapid Cooker, generally discloses a propane powered broiler that comprises a main structure large enough to enclose a cooking chamber, an infrared heat source for purportedly attaining temperatures over 900 degrees Fahrenheit, and a drawer assembly including a gridiron, base plate, rollers and other components. Though it was apparently smaller than commercial steakhouse broilers, the Molnar broiler still utilized the main structural elements of such commercial steakhouse broilers, and other conventional broilers and ovens for cooking, namely, an enclosed cooking chamber, a heat source, and a gridiron or other support for food. As a result, the Molnar broiler maintained the bulky structure and cost of such available broilers and ovens.

As another example, U.S. Pat. No. 5,606,905 to Boehm et al. for a "Device For Cooking Foodstuffs," issued Mar. 4, 1997, purports to disclose an electrical cooking device for cooking foodstuffs having a lower cooking plate and an an upper cooking plate movable relative to the lower cooking plate such that the upper and lower cooking plates form a cooking chamber which substantially restrains the escape of vapor. The Boehm patented device, ostensibly marketed as the George Foreman grill, employed an electrical heating element as its heat source. A significant disadvantage of such electric grills is that they typically reach only 400-500 degrees Fahrenheit. Thus, though electric grills may have other advantages, such as cleanliness, over gas burning devices, they are not generally viewed as a comparable alternative for consumers seeking high-end steakhouse quality flavor at home.

As yet another example, U.S. Pat. No. 9,453,642 B2 to Arnold for a "Torch and Torch Attachment," issued Sep. 27, 2016, purports to disclose an attachment for a torch that includes a combustion cone mounted on a fuel delivery tube. The Arnold patented device, ostensibly marketed as the Searzall, attempts to overcome disadvantages of other culinary torches used, for example, to caramelize crème brûlée. According to the Arnold patent, such conventional kitchen torches provide a pencil-like flame that, while potentially suitable for carmelizing sugar, is too small to uniformly broil a steak. A disadvantage of the Arnold patent design, however, is that the use of a cone inherently reduces the heat flux, that is, the rate of heat transfer per unit area, as the heat spreads out and away from the cone to a larger area. Another disadvantage is the use of wire mesh made from, for example, nichrome, by direct flame to achieve infrared radiation, as opposed to the superiority of heating porous, or honeycomb, ceramic tiles to emit infrared radiation. The foregoing disadvantages would be more apparent when using the Arnold patent design for larger and more dense food items, such as for broiling steak, than for smaller and less dense food items, such as meringue or crème brûlée.

Therefore, what is needed is a heating apparatus for heating objects, for example, to broil or sear steak and other foods at the high temperatures necessary to achieve high-end restaurant quality flavor that overcomes the size, cost, complexity and heating constraints of existing devices. The need also exists for a heating apparatus that is portable and can be used as an auxiliary or additional heat source either simultaneously with or in series to other heating processes, for example, to sear the top side of a steak while it is cooking on a conventional outdoor barbecue grill, or to sear a steak either before or after it has been cooked to a desired temperature using a sous vide method or oven.

SUMMARY OF THE INVENTION

A summary of exemplary embodiments disclosed herein is set forth below. It should be understood that the aspects of the embodiments disclosed herein are presented merely to provide a brief summary of the exemplary embodiments and that these aspects are not intended to limit the scope of this disclosure. This disclosure may encompass a variety of aspects that may not be expressly set forth below.

Embodiments of the present disclosure relate to a gas-fired heating apparatus and methods for use and, more particularly, to portable handheld ceramic tile infrared burners and methods for using the same to heat objects including, for example, to broil steak and other foods.

In accordance with some embodiments, a portable handheld ceramic tile infrared burner comprising a ceramic tile infrared burner assembly, a handle for maneuvering the ceramic tile infrared burner assembly during use, and a gas supply line for connection to a gas source is disclosed. In some embodiments, the handle and gas supply line are integrated such that the gas supply line serves as the handle for maneuvering the ceramic tile infrared burner assembly during use.

In accordance with some embodiments, the ceramic tile infrared burner assembly is at least partially enclosed in a housing. The handle may be connected to the housing such that the housing supports the ceramic tile infrared burner assembly during use. Alternatively, the handle may be connected to the ceramic tile infrared burner assembly. In either configuration, the handle and gas supply line may further be integrated such that the gas supply line serves as the handle for maneuvering the ceramic tile infrared burner assembly during use. In some embodiments, the housing comprises one or more heat shields disposed to shield the handle from excessive heat by reflecting, absorbing and dissipating heat.

In some embodiments of the portable handheld ceramic tile infrared burner, the gas supply line is connected to a gas adjustable regulator for use with disposable or refillable liquid propane, isobutane or butane cylinders. In another embodiment, the gas supply line is connected to a natural gas line, such as that available for residential or commercial use. In another embodiment, a shut-off valve is disposed between the gas supply line and the ceramic tile infrared burner assembly. Alternatively, the shut-off valve may be disposed between the gas supply line and the gas adjustable regulator. In some embodiments, the shut-off valve is a trigger-type shut-off valve disposed proximate to the handle to facilitate valve actuation conveniently with one or more fingers of a hand that is holding the handle. The use of a shut-off valve may obviate the need for a gas adjustable regulator such that a gas nonadjustable regulator may be used.

The brief summary presented above is intended only to introduce the reader with certain aspects and contexts of embodiments of the present disclosure without limitation to the claimed subject matter. Other features and advantages of the present inventions will be apparent from the accompanying drawings and from the detailed description that follows.

BRIEF DESCRIPTION OF THE DRAWINGS

Various aspects of this disclosure may be better understood by reading the following detailed description and by reference to the drawings in which.

DETAILED DESCRIPTION OF THE INVENTION

One or more specific embodiments of the present disclosure will be described below. These described embodiments are only examples of the presently disclosed apparatus. Additionally, in an effort to provide a concise description of these embodiments, all features of actual implementations may not be described. It should be appreciated that in the development of any such actual implementation, as in any engineering or design project, numerous implementation-specific decisions must be made to achieve the product developer's specific goals, such as compliance with safety, regulatory and business constraints, which may vary among implementations. It should further be appreciated that such a product development effort would be an undertaking of design and manufacture for those of ordinary skill having the benefit of the present disclosure.

Figure 1:
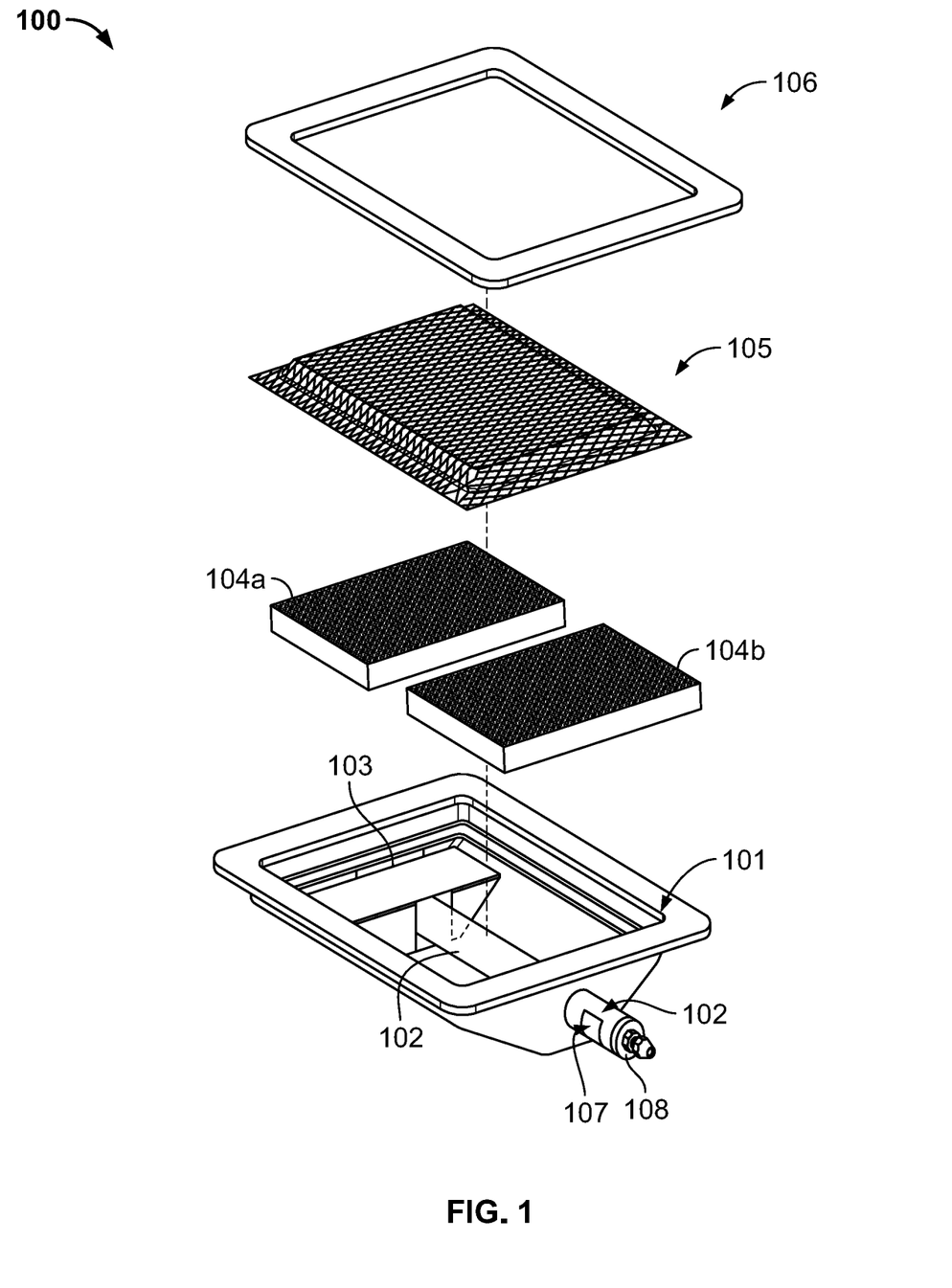
FIG. 1 is an exploded three-dimensional view of a ceramic tile infrared burner assembly.

Shown in FIG. 1 is a ceramic tile infrared burner assembly 100 of the prior art. Such burner assemblies and variants thereof are available for purchase. Ceramic tile infrared burner assemblies are further disclosed and described in U.S. Pat. No. 2,775,294 to Schwank for "Radiation Burners," issued Dec. 25, 1956. The ceramic tile infrared burner assembly 100 of FIG. 1 comprises a burner casing 101, an air/gas mix tube 102, a baffle 103, two ceramic tiles 104*a*, 104*b*, a high temperature ceramic tile gasket (not shown) disposed around the tiles that secures and seals the tiles in the burner casing 101, a heat resistant metal net 105, and a face plate 106. The burner casing 101, air/gas mix tube 102, baffle 103, heat resistant metal net 105 and face plate 106 may be made of stainless steel, aluminized steel or other alloys, cast iron or similar materials suited for use at high temperatures with corrosion resistance. In the illustrated ceramic tile infrared burner assembly 100, the burner casing 101 is stamped, the air/gas mix tube 102 and baffle 103 are spot welded to the burner casing 101 and the metal net 105 and face plate 106 are attached to the burner casing 101 by sheet metal screws, though other conventional means of manufacturing and fastening may be employed.

The air/gas mix tube 102 extends through the burner casing 101. The portion of the air/gas mix tube 102 that is external to the burner casing 101 includes one or more apertures 107 for air intake. The distal end of the air/gas mix tube 102 is enclosed with a threaded washer 108 welded to the end of the air/gas mix tube 102. The threads of the washer 108 may accommodate a brass nozzle injector or orifice for injecting gas into the air/gas mix tube 102. The ceramic tile infrared burner assembly 100 may be supplied by, for example, natural gas (typically consisting primarily of methane but sometimes containing small amounts of ethane, propane, butane, pentane, nitrogen, carbon dioxide, or other gases) commonly regulated to around 7 inches of water column (approximately 0.25 psi), or liquid propane gas, commonly regulated to around 11 inches of water column (approximately 0.4 psi). Exemplary overall dimensions for the ceramic tile infrared burner assembly 100 are 220 mm×170 mm×60 mm. A ceramic tile infrared burner assembly of this size could be used to generate 10,000 BTUs per hour depending on whether liquid propane, butane, isobutane or natural gas are used, the pressure of the gas supply, the size of the injector/orifice and environmental conditions such as elevation, temperature and humidity.

Figure 2:
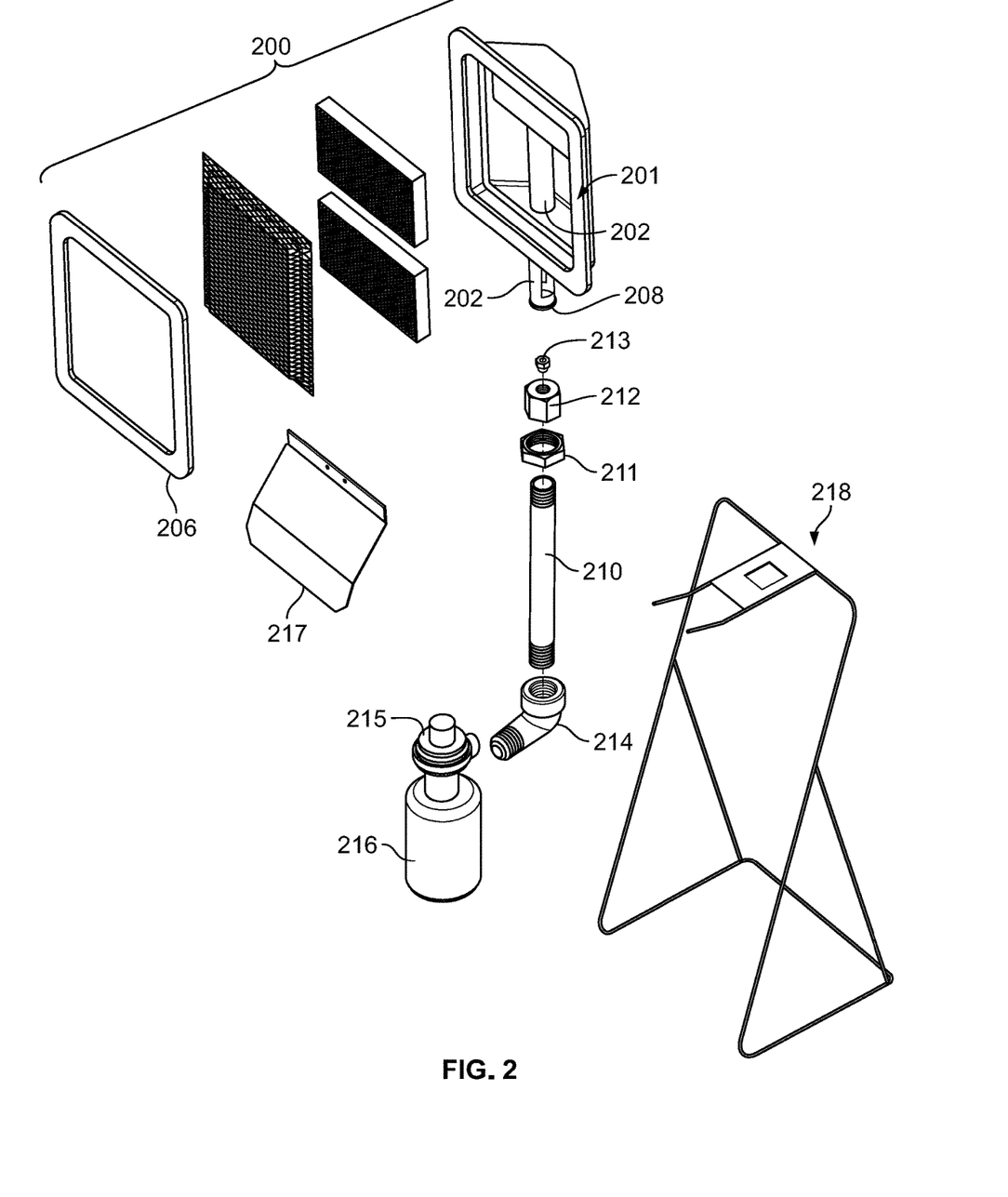
FIG. 2 is an exploded three-dimensional view of a portable handheld ceramic tile infrared burner, in accordance with some embodiments of the invention.
Figure 3:
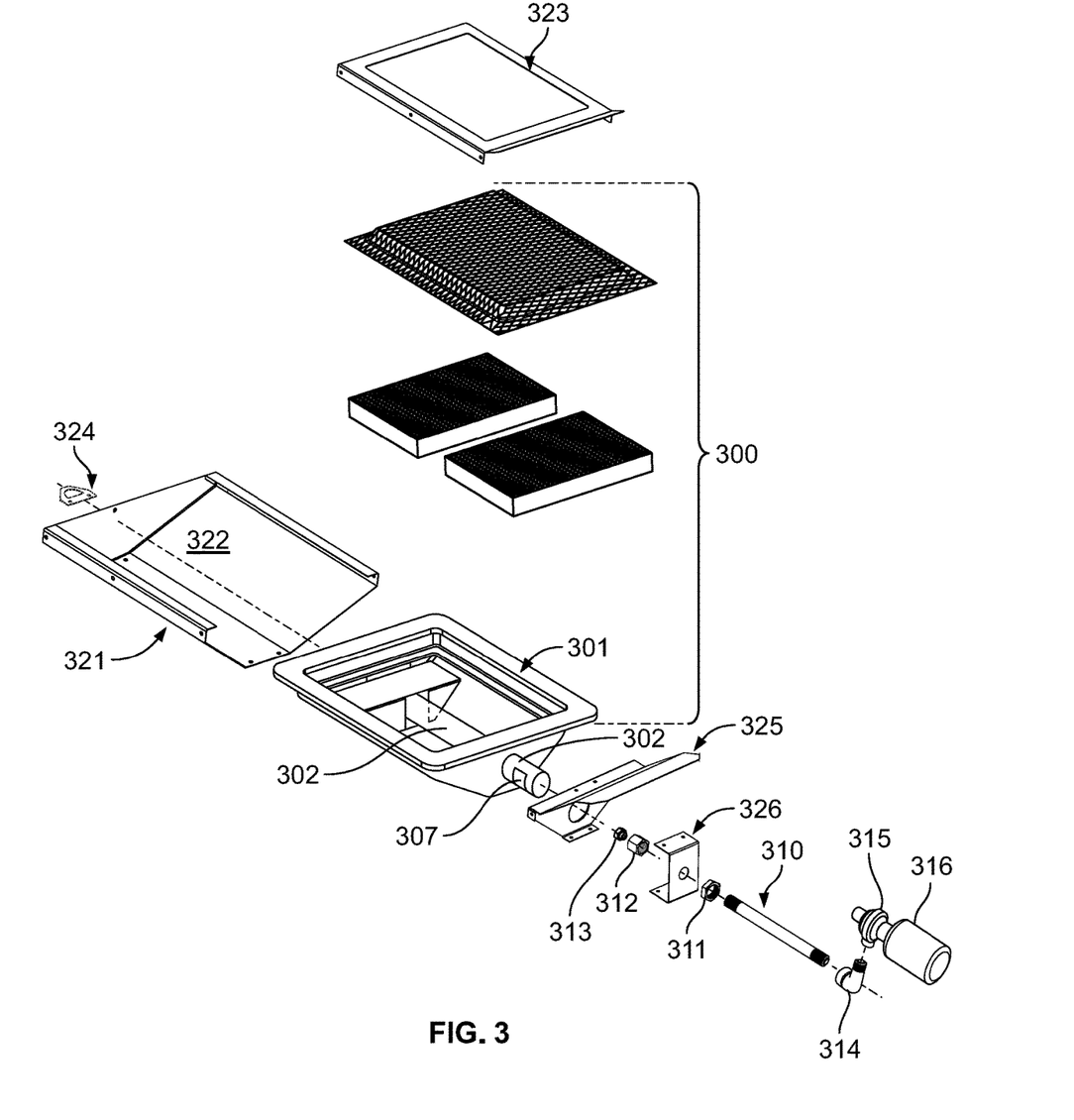
FIG. 3 is an exploded three-dimensional view of a portable handheld ceramic tile infrared burner, in accordance with other embodiments of the invention.

FIGS. 2-3 illustrate portable handheld ceramic tile infrared burners in accordance with some embodiments of the invention. In particular, FIG. 2 shows a portable handheld ceramic tile infrared burner including a ceramic tile infrared burner assembly 200 and a handle with integrated gas supply line 210 for maneuvering the ceramic tile infrared burner assembly during use, in accordance with some embodiments. In the illustrated embodiment, the handle with integrated gas supply line 210 is a standard-wall 304 stainless steel pipe nipple, male threaded ¼" NPT on both ends, ¼ pipe size, and 6.5 inches long. The handle with integrated gas supply line 210 is secured to the distal end of the air/gas mix tube 202, which is enclosed with a threaded washer 208 welded to the end of the air/gas mix tube. In a preferred embodiment, the threaded washer 208 is welded to the end of the air/gas mix tube 202 at an angle such that the longitudinal axis of the threaded washer 208 is, for example, approximately five to ten degrees askew of the longitudinal axis of the air/gas mix tube 202. As a result, if the ceramic tile infrared burner assembly 200 is fully horizontal during use, such as to broil a steak, a disposable or refillable liquid propane cylinder connected to the handle with integrated gas supply line 210 will be tilted five to ten degrees from horizontal to prevent flashes or flare ups that may occur as a result of tilting the liquid propane cylinder to a fully horizontal position. The washer 208 is threaded ¼" female NPT to accommodate the male threaded ¼" NPT handle with integrated gas supply line 210. The handle with integrated gas supply line 210 is preferably covered with a multipurpose blended neoprene foam tube for hand comfort during use. In the illustrated embodiment, the foam tube has a 1.0 inch OD and a 0.5 inch ID, and is made from flexible EPDM/Neoprene/Polyetheylene foam with skin for easy cleaning, though other suitable materials may be used.

The handle with integrated gas supply line 210 is preferably further secured to the distal end of the air/gas mix tube 202, such as with a locknut 211 external to the air/gas mix tube 202 and a reducer coupling 212 internal to the air/gas mix tube 202. In the illustrated embodiment, the locknut 211 is a 304 stainless steel low-pressure locknut threaded ¼" female NPSL. The reducer coupling 212 is custom fabricated from ¹¹⁄₁₆" hexagonal stainless steel with an overall length of 0.58 inches (14.73 mm) reducing ¼" female NPT tapped 0.402 inches (10.2 mm) deep to ⁵⁄₁₆-32 UNEF tapped through. The ¼" female NPT end of the reducer coupling 212 is flat (no chamfered edges) to increase surface area for securing the handle with integrated gas supply line 210 to the distal end of the air/gas mix tube 202. The ⁵⁄₁₆-32 UNEF tapped through end of the reducer coupling 212 may or may not have chamfered corners similar to conventional hexagonal nuts. Pipe thread sealant tape, such as PTFE, should be used for the pipe thread connections disclosed herein. Alternatively, thread-locking fluid may be used for additional safety by discouraging and/or preventing disassembly.

In the illustrated embodiment, the ⁵⁄₁₆-32 UNEF tapped through end of the reducer coupling 212 accommodates a brass flat tip plug orifice 213, 0.219 inches in length, 0.375 inch hexagonal head, ⁵⁄₁₆-32 UNEF threads, and 0.85 mm size orifice for propane gas. Larger drill size orifices, such as #56 (0.0465 inches or 1.1811 mm), may be used to achieve higher flow rates and, consequently, more heat (e.g. 10,000 BTUs or more). In an embodiment where the ceramic tile infrared burner assembly is to be supplied by a natural gas line, commonly regulated to around 7 inches of water column (approximately 0.25 psi) as compared to a propane gas line regulated to around 11 inches of water column (approximately 0.4 psi), an even larger drill size such as #53 (0.0595 inches or 1.5113 mm) may be necessary to achieve 10,000 or more BTUs. The orifice size may further be modified and tuned to accommodate the use of isobutane or butane (which have lower vapor pressures than propane), or mixes of propane, isobutane and butane.

In the illustrated embodiment of FIG. 2, a 304 stainless steel low-pressure 90 degree street elbow 214 ¼" female NPT to ¼" male NPT is connected to the ¼" male NPT distal end of the handle with integrated gas supply line 210 opposite the ceramic tile infrared burner assembly 200. The ¼" male NPT side of the 90 degree street elbow 214, in turn, is connected to a gas adjustable regulator 215 for a disposable liquid propane cylinder 216, such as that manufactured by Precimex, Model No. 6000-004, CGA #600 inlet and ¼" female NPT outlet with a 90 degree angle from inlet to outlet. The CGA #600 inlet is suitable for connection to a conventional disposable liquid propane cylinder 216, such as that manufactured by Coleman, though other valve connection types may be used depending on the cannister size and type of gas. In the illustrated embodiment of FIG. 2, the handle with integrated gas supply line 210 is disposed generally between the ceramic tile infrared burner assembly 200 and the disposable liquid propane cylinder 216 such that the handle with integrated gas supply line 210 is at or near the center of mass of the entire portable handheld ceramic tile infrared burner. Disposing the handle with integrated gas supply line 210 at the center of mass provides easy maneuverability. In other embodiments, however, the handle is separate from the gas supply line, rather than integrated, and may be disposed at any convenient location, such as further from the ceramic tile infrared burner assembly 200 and closer to the disposable liquid propane cylinder 216 or other gas source for safety or other design specific reasons.

In an alternative embodiment, a ¼" female NPT to ¼" male NPT on/off ball valve, suitable for use with butane/natural gas/propane, is connected to the ¼" male NPT distal end of the handle with integrated gas supply line 210 opposite the ceramic tile infrared burner assembly 200, though the on/off ball valve with appropriate thread connections may also be disposed at the other end between the handle with integrated gas supply line 210 and the ceramic tile infrared burner assembly. The 304 stainless steel low-pressure 90 degree street elbow 214 ¼" female NPT to ¼" male NPT is connected to the ¼" male NPT end of the on/off ball valve. Alternatively, a 90 degree elbow on/off valve may be used to obviate the need for a separate 90 degree street elbow. But, in an embodiment where the 90 degree street elbow 214 is used, the ¼" male NPT side of the 90 degree street elbow 214, in turn, is connected to a gas nonadjustable regulator for disposable liquid propane cylinders, such as that manufactured by Precimex, Model No. 6004-FN4, CGA #600 inlet and ¼" female NPT outlet with a 90 degree angle from inlet to outlet. The on/off ball valve obviates the need for a gas adjustable regulator in this embodiment; however, a gas adjustable regulator could still be used with the on/off ball valve. In yet another embodiment, the on/off ball valve in the foregoing embodiments is replaced with a snap-shut threaded trigger-type on/off valve where the trigger is disposed proximate to the handle to facilitate valve actuation conveniently with one or more fingers of a hand that is holding the handle.

In some embodiments, a heat shield 217 formed from 24 gauge 304 stainless steel sheet metal through conventional sheet metal cutting and bending techniques is disposed between the ceramic tile infrared burner assembly 200 and the handle with integrated gas supply line 210. In the illustrated embodiment, the heat shield 217 is attached to the burner casing 201 by sheet metal screws and is disposed beneath the face plate 206. An an alternative embodiment, the heat shield 217 is comprised of two or more layers offset, for example, by approximately 0.25 inches, to provide additional protection to a hand holding the handle from excessive heat by reflecting, absorbing and dissipating heat. The heat shield 217 is preferably long and wide enough to ensure adequate shielding and protection from the convective and radiant heat coming from the face of the ceramic tile infrared burner assembly 200. In an alternative embodiment, the face plate 206 and heat shield 217 may be a unitary component rather than separate components. In yet another alternative embodiment, the one or more heat shields may be attached to the handle with integrated gas supply line 210 with suitable fastening mechanisms.

The illustrated embodiment of FIG. 2 operates by opening the gas adjustable regulator 215 to a lighting position (which starts the flow of gas). The gas flows through the gas adjustable regulator 215, the 90 degree street elbow 214, the handle with integrated gas supply line 210, and the reducer coupling 212 to the brass flat tip plug orifice 213. The brass flat tip plug orifice 213 injects the gas into the air/gas mix tube 202 to mix with air as it enters the ceramic tile infrared burner assembly 200. A handheld lighter may be used to ignite the air/gas mixture at the top of the face of the ceramic tile infrared burner assembly 200 as it flows through the pores in the ceramic tiles. Combustion of the air/gas mixture can cause the ceramic tiles to reach temperatures at or exceeding 1600 degrees Fahrenheit. After ignition, the gas adjustable regulator 215 should be adjusted from the lighting position to the low, medium or high position depending on the desired use temperature. An exemplary storage assembly 218 is shown in FIG. 2 for storing the portable handheld ceramic tile infrared burner between uses. The storage assembly 218 is preferably configured to store the portable handheld ceramic tile infrared burner such that the cylinder 216 is positioned upright as shown in FIG. 2.

FIG. 3 shows a portable handheld ceramic tile infrared burner including a ceramic tile infrared burner assembly 300 and a handle with integrated gas supply line 310 for maneuvering the ceramic tile infrared burner assembly during use, in accordance with other embodiments of the invention. The portable handheld ceramic tile infrared burner of FIG. 3 shares many of the features, embodiments and alternative embodiments disclosed above with respect to FIG. 2. However, the portable handheld ceramic tile infrared burner of FIG. 3 includes a ceramic tile infrared burner assembly 300 at least partially enclosed in a housing 321. The interior dimensions of the housing 321 are sized to accommodate, preferably with a snug fit, the exterior dimensions of the ceramic tile infrared burner assembly 300. In the illustrated embodiment, the housing 321 is formed from 24 gauge 304 stainless steel sheet metal through conventional sheet metal cutting and bending techniques. In the illustrated embodiment, the housing 321 comprises a back piece 322, a face plate with integrated heat shield 323, a hanger 324, a bottom piece with integrated heat shield 325, and a U-bracket 326. The faceplate with integrated heat shield 323 obviates the need for the face plate 106 of FIG. 1 and 206 of FIG. 2. The foregoing components of the housing 321 may be fastened together with sheet metal screws, rivets, spot welds, or other fastening mechanisms suitable for high heat and corrosion resistance. The sheet metal for the hanger 324 and U-bracket 326 may preferably be formed from a thicker gauge 304 stainless steel sheet metal, such as 22 or 23 gauge, for additional strength, though thinner or thicker gauge material may be used for all housing components depending on desired weight, price and robustness levels. (Notably, a hanger 324 may also be employed in the portable handheld ceramic tile infrared burner embodiments of FIG. 2 without a housing, wherein the hanger 324 will be attached to the ceramic tile infrared burner assembly 200.) Alternative materials for all housing 321 components include 316 stainless steel, 309(S) and 310(S) stainless steel for higher temperature rating, and other materials suited for use at high temperatures with corrosion resistance. The housing may be laser etched, engraved or cut with lettering indicating serial numbers, instructions for use, logos or other text.

The handle with integrated gas supply line 310 may be connected to the housing 321 via the U-bracket 326 which is attached to the bottom piece 325 such that the housing supports the ceramic tile infrared burner assembly 300 during use. (Notably, in the embodiments of FIG. 2 without a housing, a U-bracket may also be used to connect the handle with integrated gas supply line 210 to the bottom of the burner casing 201, as opposed to connecting the handle with integrated gas supply line 210 to the air/gas mix tube 202) In the illustrated embodiment of FIG. 3, the handle with integrated gas supply line 310 is a standard-wall 304 stainless steel pipe nipple, male threaded ¼" NPT on both ends, ¼ pipe size, and 6.5 inches long. The handle with integrated gas supply line 310 is secured to U-bracket 326 which has a hole threaded ¼" female NPT to accommodate the male threaded ¼" NPT handle with integrated gas supply line 310. The hole in the U-bracket is approximately concentric to the center of the air/gas mix tube 302, which extends through the burner casing 301 and through a hole in the bottom piece 325 of the housing to a distance proximate to the orifice, such that the orifice injects gas into the air/gas mix tube 302. The air/gas mix tube 302 may also be flush with the burner casing 301, but it preferably extends through the burner casing 301 to be flush with the bottom piece 325. In this embodiment, the distal end of the air/gas mix tube 302 is not enclosed with a threaded washer as in FIG. 2, but instead, is open to receive gas from the orifice and to permit air intake. One or more apertures 307 on the sides of the air/gas mix tube 302 may also be employed to promote further air intake, especially where the air/gas mix tube 302 extends through the burner casing 301 and through a hole in the bottom piece 325 of the housing to a distance closely proximate to the orifice. In a preferred embodiment, the bottom of the U-bracket 326 is bent at an angle such that the longitudinal axis of the hole threaded ¼" female NPT is, for example, approximately five to 10 degrees askew of the longitudinal axis of the air/gas mix tube 302. As a result, if the ceramic tile infrared burner assembly 300 is fully horizontal during use, such as to broil a steak, a disposable or refillable liquid propane cylinder connected to the handle with integrated gas supply line 310 will be tilted five to 10 degrees from horizontal to prevent flashes or flare ups that may occur as a result of tilting the liquid propane cylinder to a fully horizontal position.

The handle with integrated gas supply line 310 is preferably further secured to the housing 321, such as via the hole threaded ¼" female NPT in the U-bracket 326 with a locknut 311 external to the U-bracket 326 and a reducer coupling 312 internal to the U-bracket 326. In the illustrated embodiment, the locknut 311 is a 304 stainless steel low-pressure locknut threaded ¼" female NPSL. The reducer coupling 312 is custom fabricated from ¹¹⁄₁₆" hexagonal stainless steel with an overall length of 0.58 inches (14.73 mm) reducing ¼" female NPT tapped 0.402 inches (10.2 mm) deep to ⁵⁄₁₆-32 UNEF tapped through. The ¼" female NPT end of the reducer coupling 312 is flat (no chamfered edges) to increase surface area for securing the handle with integrated gas supply line 310 to the U-bracket 326. The ⁵⁄₁₆-32 UNEF tapped through end of the reducer coupling 312 may or may not have chamfered corners similar to conventional hexagonal nuts.

In an alternative embodiment, not shown, the handle with integrated gas supply line 310 is not connected to the housing 321 via U-bracket 326, but instead, the handle with integrated gas supply line 310 is secured to the distal end of the air/gas mix tube 302 as described above with respect to FIG. 2, thus obviating the need for U-bracket 326.

The portable handheld ceramic tile infrared burner of FIG. 3 shares the other features, embodiments and alternative embodiments disclosed and discussed above with respect to FIG. 2, including with respect to the brass flat tip plug orifice 313, 90 degree street elbow 314, gas adjustable regulator 315, and disposable liquid propane cylinder 316. This further includes the on/off ball valve, snap-shut threaded trigger-type on/off valve, and gas nonadjustable regulator alternative embodiments disclosed and discussed herein above. In the illustrated embodiment of FIG. 3, the handle with integrated gas supply line 310 is disposed generally between the ceramic tile infrared burner assembly 300 and housing 321, on one end, and the disposable liquid propane cylinder 316, on the other end, such that the handle with integrated gas supply line 310 is at or near the center of mass of the entire portable handheld ceramic tile infrared burner. In other embodiments, however, the handle is separate from the gas supply line, rather than integrated, and may be disposed at any convenient location, such as further from the ceramic tile infrared burner assembly 300 and closer to the disposable liquid propane cylinder 316 or other gas source for safety or other design specific reasons. The portable handheld ceramic tile infrared burner of FIG. 3 operates similarly to that illustrated in FIG. 2, that is, by opening the gas adjustable regulator 315 to a lighting position (which starts the flow of gas). The gas flows through the gas adjustable regulator 315, the 90 degree street elbow 314, the handle with integrated gas supply line 310, and the reducer coupling 312 to the brass flat tip plug orifice 313. The brass flat tip plug orifice 313 injects the gas into the air/gas mix tube 302 to mix with air as it enters the ceramic tile infrared burner assembly 300. A handheld lighter may be used to ignite the air/gas mixture at the top of the face of the ceramic tile infrared burner assembly 300 as it flows through the pores in the ceramic tiles. After ignition, the gas adjustable regulator 315 should be adjusted from the lighting position to the low, medium or high position depending on the desired use temperature.

The various embodiments of portable handheld ceramic tile infrared burners described herein may be used for heating objects, for example, to broil or sear steak and other foods at the high temperatures necessary to achieve high-end restaurant quality flavor without using commercial grade infrared broilers or salamanders with large enclosed cooking chambers. The various embodiments of portable handheld ceramic tile infrared burners described herein may further be used as an auxiliary or additional heat source either simultaneously with or in series to other heating processes, for example, to sear the top side of a steak while it is cooking on a conventional outdoor barbecue grill, or to sear a steak either before or after it has been cooked to a desired temperature using a sous vide method or oven.

The United States Department of Agriculture recommends safe minimum internal temperatures for cooking meats. The current recommendations include 145° F. for beef, pork, veal and lamb, 160° F. for ground meats, and 145° F. for fresh or smoked ham. Notwithstanding the foregoing recommendations, individual preferences may dictate the degree of doneness sought (e.g. rare, medium rare, medium, medium well, well done) and the associated temperature. The portable handheld ceramic tile infrared burner described herein may be used alone or as an auxiliary or additional heat source either simultaneously with or in series to other cooking processes to achieve these desired temperatures.

For example, thin strips of beef or other meat may be cooked solely by use of the portable handheld ceramic tile infrared burner, preferably by placing the strips of beef or other meat on a gridiron, operating the portable handheld ceramic tile infrared burner as described herein and holding the portable handheld ceramic tile infrared burner approximately six inches above the beef or other meat to achieve desired doneness. As another example, a boneless 1 lb. rib-eye steak may first be cooked through to a desired temperature (e.g. 140-145° F. for medium doneness) using a sous vide method. Then, the steak may be set on a gridiron and seared for 60-90 seconds per side by operating the portable handheld ceramic tile infrared burners as described herein and holding the portable handheld ceramic tile infrared burner approximately six inches above the steak to achieve desired doneness. Due to the portable nature of the handheld ceramic tile infrared burner of the invention, such searing may even be done tableside to entertain invited guests at home or patrons in a commercial restaurant. The portable handheld ceramic tile infrared burners described herein may further be used to sear the top side of a steak while it is cooking on a conventional outdoor barbecue grill where the latter fails to achieve the requisite sear, char, browning or "Maillard effect" to produce desired flavors. Notably, when using the portable handheld ceramic tile infrared burner to cook in conjunction with other cooking processes, the portable handheld ceramic tile infrared burner may be used before, during and/or after such other processes. As an example, some chefs may prefer to sear a steak with the portable handheld ceramic tile infrared burner first and finish cooking the steak in an oven, while some chefs may prefer to cook the steak first in an oven and then finish the cooking process by searing the steak with the portable handheld ceramic tile infrared burner just prior to serving.

The present disclosure is not limited to the configurations, materials or fastening mechanisms herein, but rather the specific embodiments described above have been provided by way of example, and it should be understood that these embodiments may be susceptible to various modifications and alternative forms in accordance with the teachings of the present disclosure. It should be further understood that the claims are not intended to be limited to the particular forms disclosed, but rather to cover all modifications, equivalents, and alternatives falling within the spirit and scope of this disclosure. It should be further understood that the applicant does not intend any of the claims or claim elements to invoke 35 U.S.C. § 112(f) unless the words "means for" or "step for" are expressly used.

What is claimed is:

1. A portable handheld ceramic tile infrared burner comprising:
   a ceramic tile infrared burner assembly comprising a burner casing, an air/gas mix tube, one or more ceramic tiles, and a heat resistant metal net, the ceramic tile infrared burner assembly at least partially enclosed in a housing;
   a nozzle injector or orifice for injecting gas into the ceramic tile infrared burner assembly;
   a handle with an integrated gas supply line, disposed between the ceramic tile infrared burner assembly and a gas cylinder, for maneuvering the ceramic tile infrared burner assembly into a horizontal position during use whereby a face of the ceramic tile infrared burner assembly faces downwards to heat objects below the face,
   the gas supply line arranged to connect to the gas cylinder such that the gas cylinder is disposed at an elevation lower than the nozzle injector or orifice when the ceramic tile infrared burner assembly is in said horizontal position, wherein said lower elevation of the gas cylinder prevents flashes or flare ups.

2. The portable handheld ceramic tile infrared burner of claim 1, further comprising a heat shield disposed between the ceramic tile infrared burner assembly and the handle.

3. The portable handheld ceramic tile infrared burner of claim 1, wherein the handle further comprises a foam cover.

4. The portable handheld ceramic tile infrared burner of claim 1, further comprising an on/off valve to allow or prevent gas flow.

5. The portable handheld ceramic tile infrared burner of claim 1, further comprising a gas adjustable or nonadjustable regulator.

6. The portable handheld ceramic tile infrared burner of claim 1, wherein the handle is secured to the housing.

7. The portable handheld ceramic tile infrared burner of claim 1, wherein the gas supply line is angled relative to the ceramic tile infrared burner assembly to prevent tilting the gas cylinder.

8. The portable handheld ceramic tile infrared burner of claim 1, further comprising a hanger.

9. A portable handheld ceramic tile infrared burner comprising:
- a ceramic tile infrared burner assembly at least partially enclosed in a housing, the ceramic tile infrared burner assembly comprising a burner casing, an air/gas mix tube, a baffle, one or more ceramic tiles, and a heat resistant metal net, the housing comprising a back piece, a bottom piece, a face plate, and a hanger;
- a nozzle injector or orifice tor injecting gas into the ceramic tile infrared burner assembly;
- a handle with an integrated gas supply line disposed between the ceramic tile infrared burner assembly and a gas cylinder, the handle connected to the bottom piece of the housing for maneuvering the ceramic tile infrared burner assembly into a horizontal position during use whereby a face of the ceramic tile infrared burner assembly faces downwards to heat objects below the face, the gas supply line arranged to connect to the gas cylinder such that the gas cylinder is disposed at an elevation lower than the nozzle injector or orifice when the ceramic tile infrared burner assembly is in said horizontal position, wherein said lower elevation of the gas cylinder prevents flashes or flare ups.

10. The portable handheld ceramic tile infrared burner of claim 9, wherein the housing comprises one or more heat shields.

11. The portable handheld ceramic tile infrared burner of claim 9, wherein the bottom piece of the housing has an integrated heat shield.

12. The portable handheld ceramic tile infrared burner of claim 9, wherein the back piece, the bottom piece, the face plate and the hanger are made of stainless steel.

13. The portable handheld ceramic tile infrared burner of claim 9, further comprising a gas adjustable or nonadjustable regulator.

* * * * *